(12) United States Patent
Katagiri

(10) Patent No.: US 12,319,144 B2
(45) Date of Patent: Jun. 3, 2025

(54) DISPLAY CONTROL DEVICE, DISPLAY DEVICE, AND DISPLAY CONTROL METHOD

(71) Applicant: Nippon Seiki Co., Ltd., Niigata (JP)

(72) Inventor: Masaki Katagiri, Niigata (JP)

(73) Assignee: Nippon Seiki Co., Ltd., Niigata (JP)

( * ) Notice: Subject to any disclaimer, the term of this patent is extended or adjusted under 35 U.S.C. 154(b) by 0 days.

(21) Appl. No.: 18/696,978

(22) PCT Filed: Sep. 27, 2022

(86) PCT No.: PCT/JP2022/035828
§ 371 (c)(1),
(2) Date: Mar. 27, 2024

(87) PCT Pub. No.: WO2023/054305
PCT Pub. Date: Apr. 6, 2023

(65) Prior Publication Data
US 2024/0399868 A1 Dec. 5, 2024

(30) Foreign Application Priority Data
Sep. 28, 2021 (JP) ................. 2021-157452

(51) Int. Cl.
*B60K 35/233* (2024.01)
*B60K 35/234* (2024.01)
*B60K 35/235* (2024.01)

(52) U.S. Cl.
CPC .......... *B60K 35/234* (2024.01); *B60K 35/233* (2024.01); *B60K 35/235* (2024.01)

(58) Field of Classification Search
CPC ... B60K 35/234; B60K 35/233; B60K 35/235
See application file for complete search history.

(56) References Cited

U.S. PATENT DOCUMENTS

| 12,043,291 B2 * | 7/2024 | Gäng et al. ....... B60W 60/0051 |
| 2016/0159280 A1 * | 6/2016 | Takazawa .............. G08G 1/166 345/8 |
| 2018/0286094 A1 * | 10/2018 | Shishido ................ G06T 11/60 |

FOREIGN PATENT DOCUMENTS

| JP | 2015-11666 A | 1/2015 |
| WO | 2017/046937 A1 | 3/2017 |

OTHER PUBLICATIONS

International Search Report received in PCT Application No. PCT/JP2022/035828, dated Dec. 13, 2022.

* cited by examiner

*Primary Examiner* — Towfiq Elahi
(74) *Attorney, Agent, or Firm* — Rimon P.C.

(57) ABSTRACT

The present invention is to achieve a HUD display that is easy for an occupant to see while reducing a sense of discomfort by limiting obstruction of actual scene visibility. A display control device 700 includes a control unit 701 that controls a visibility level and a display state of a display object, wherein, in a case of performing a low-visibility process for setting the visibility level of the display object to a second visibility level lower than a first visibility level, the control unit performs a display object recognizability improvement process that includes at least one of the following: increasing the number of display elements 300, 302, 304 forming the display object compared to the case in which the first visibility level is set; and expanding the size of some or all of the display elements forming the display object compared to the case in which the first visibility level is set.

10 Claims, 7 Drawing Sheets

[FIG.1]
(A)
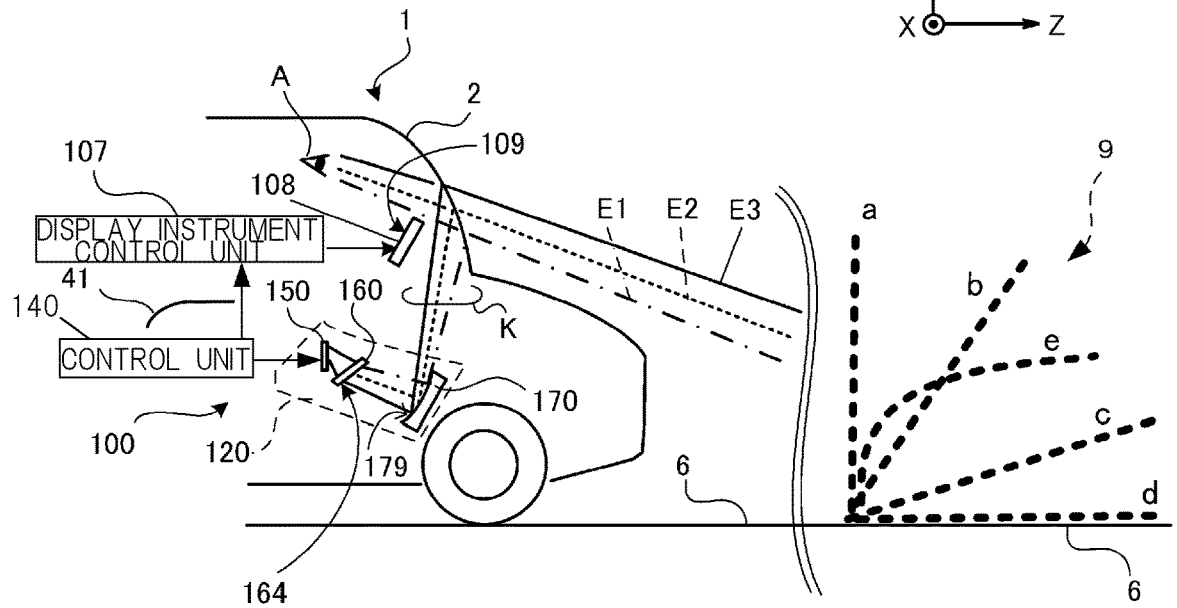
(B)
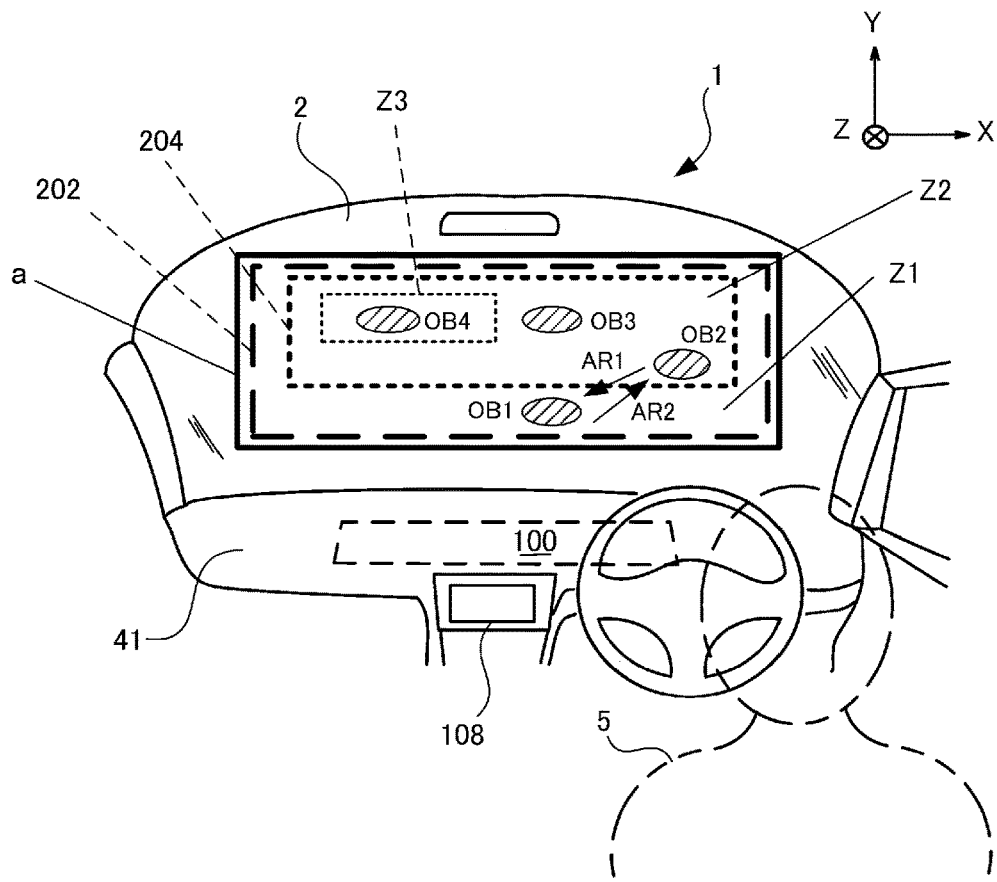

[FIG.2]
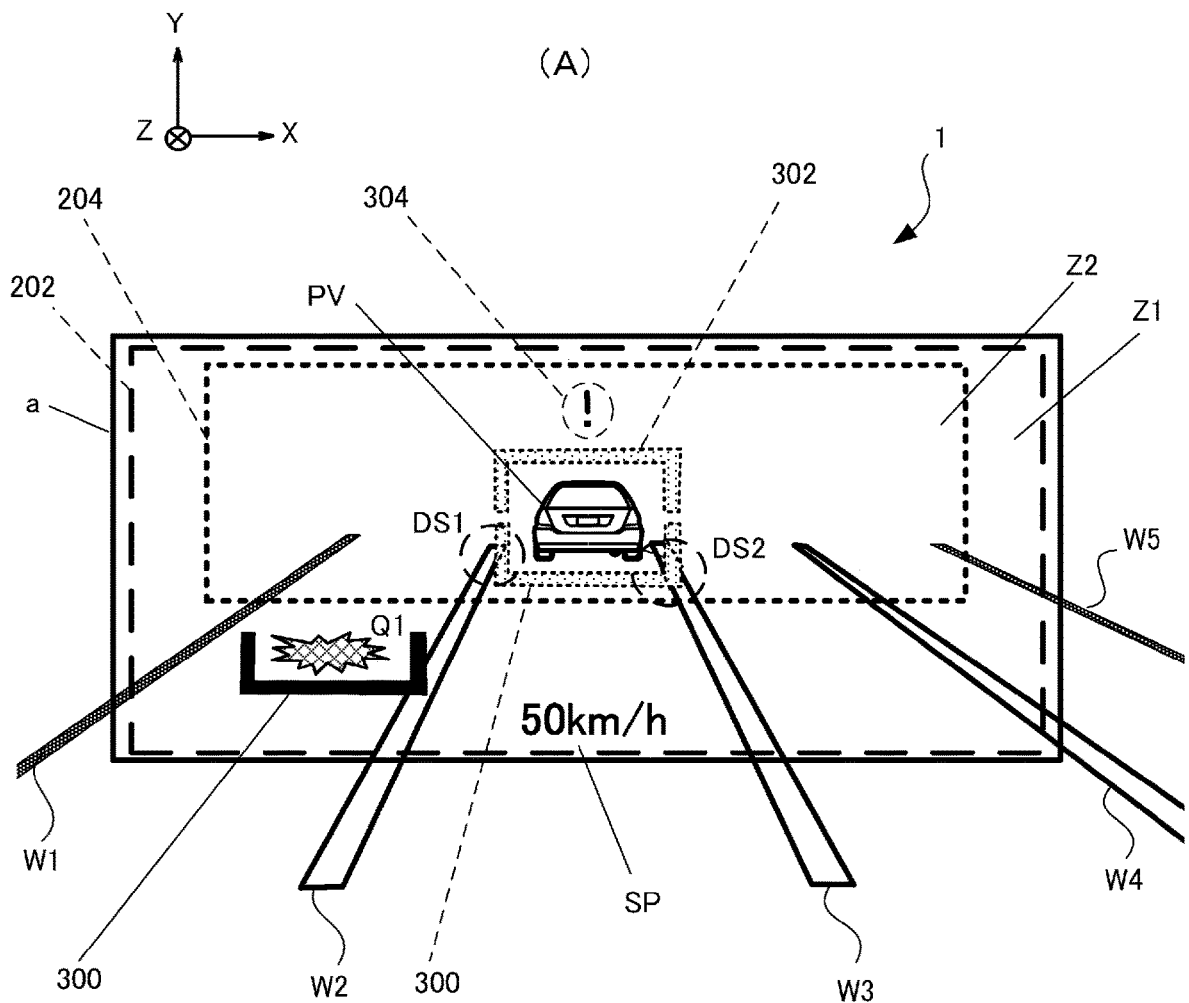
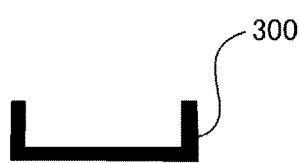
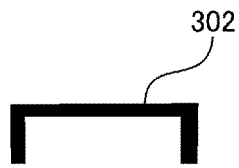
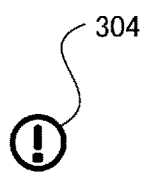
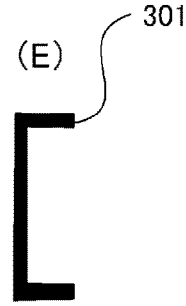
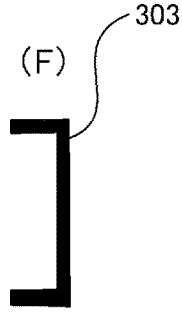
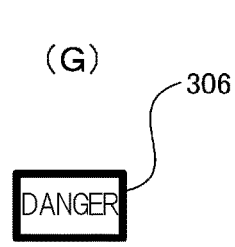

[FIG.3]
(A)
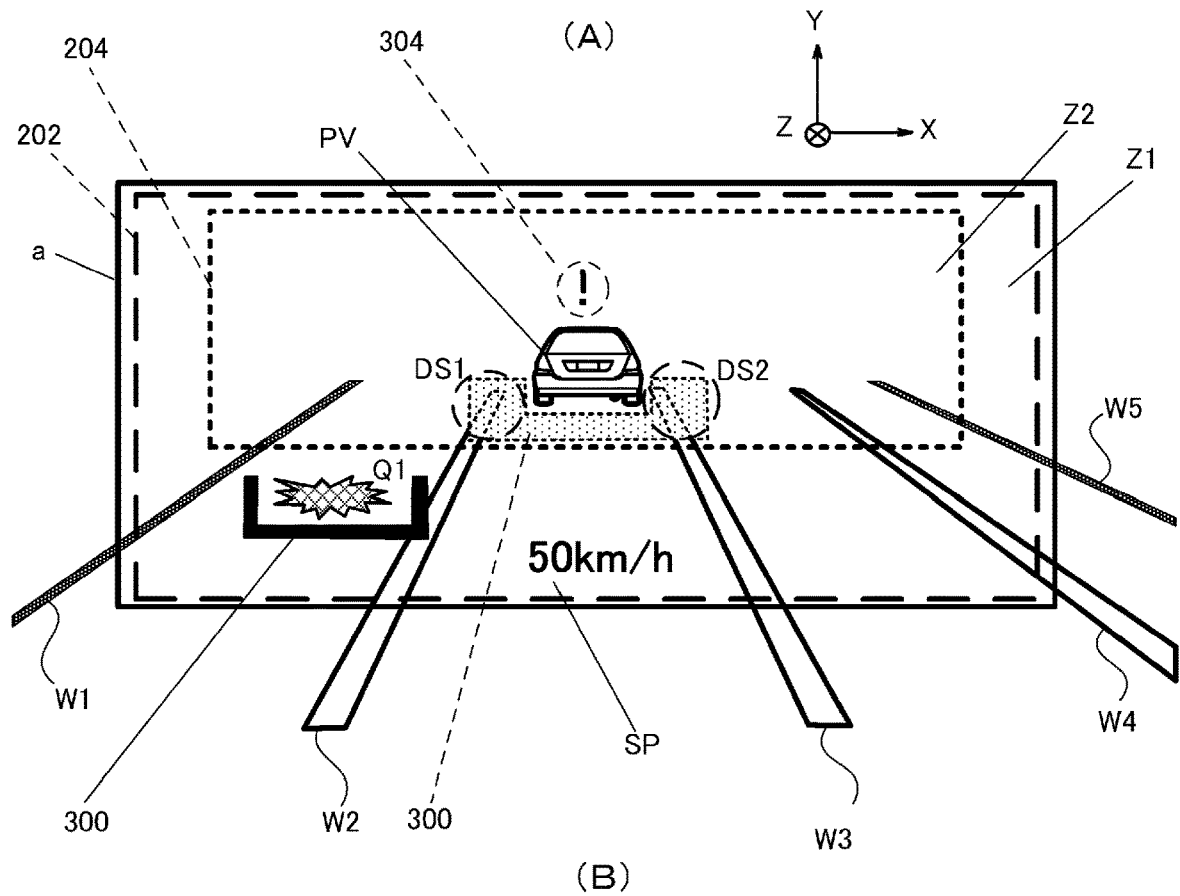
(B)
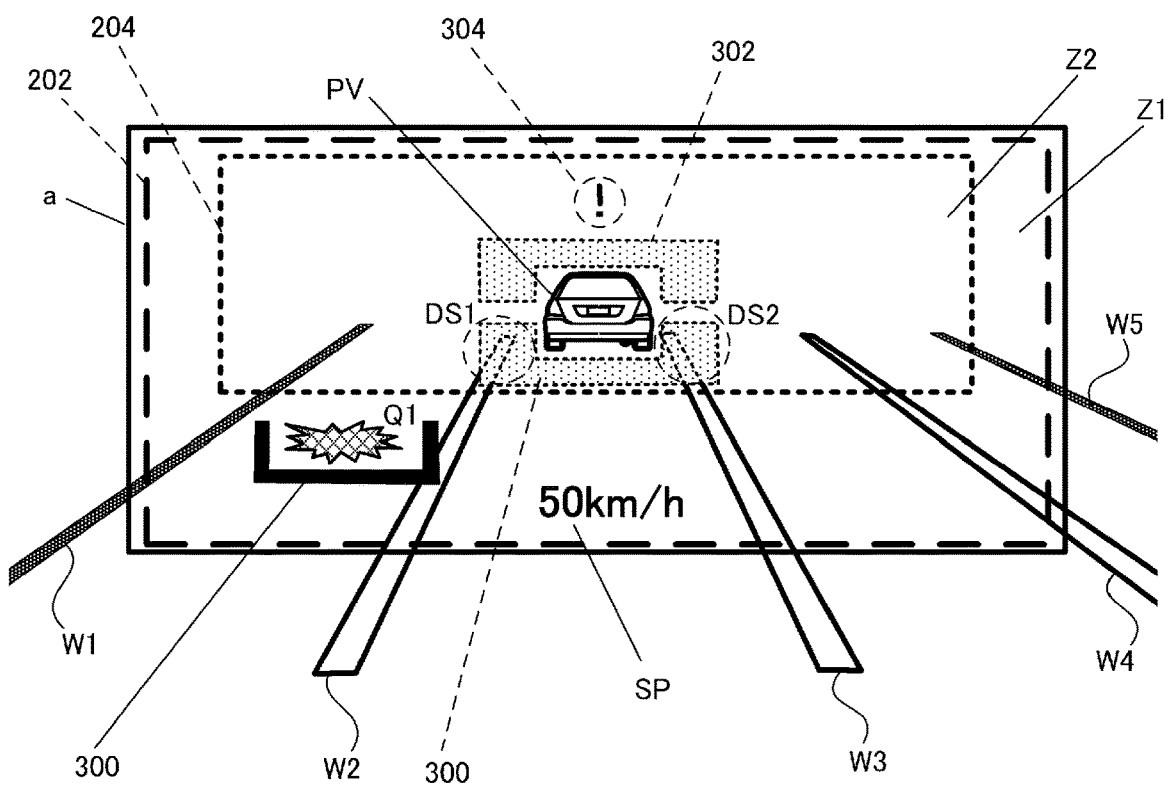

[FIG.4]
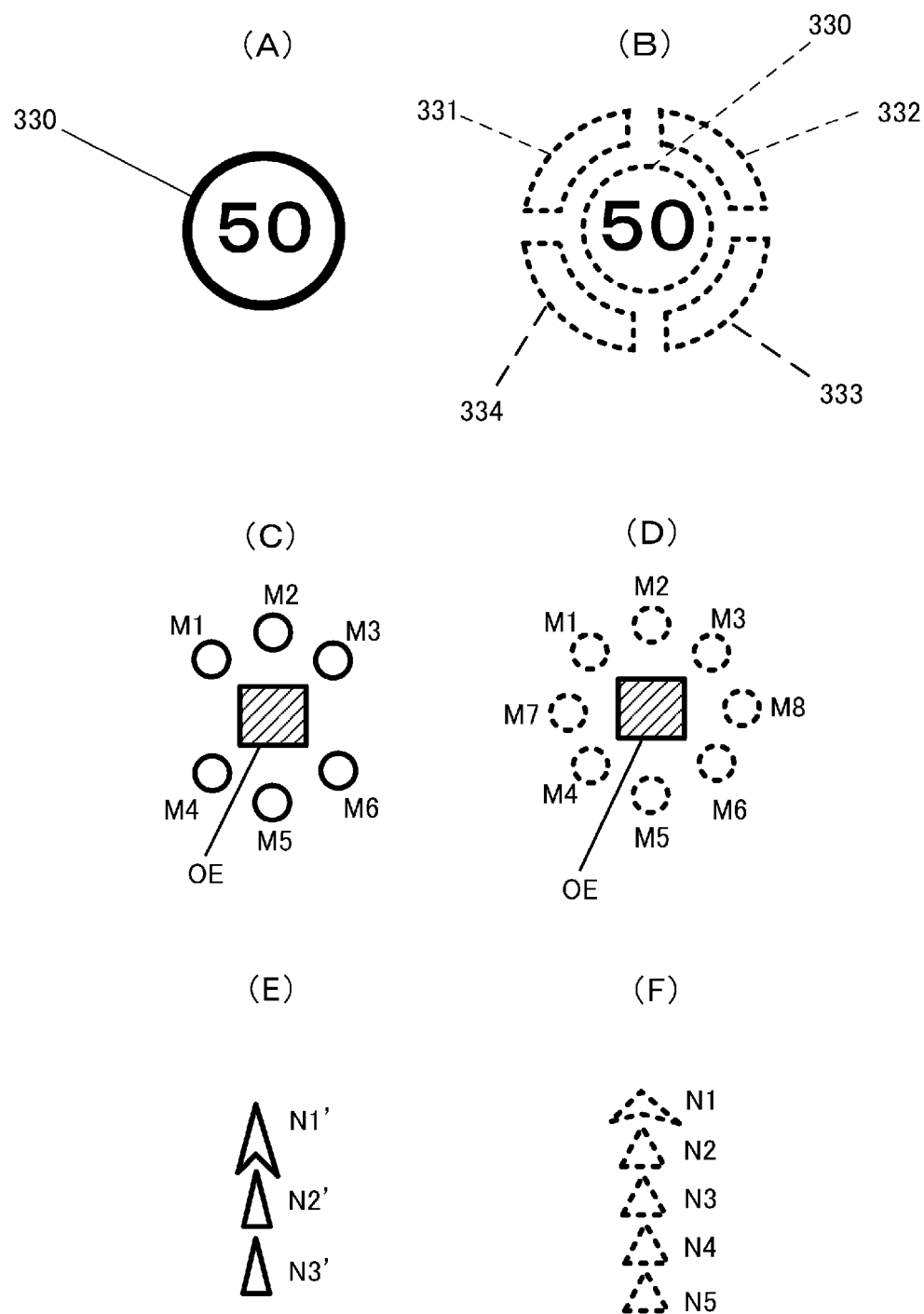

[FIG.5]
(A)
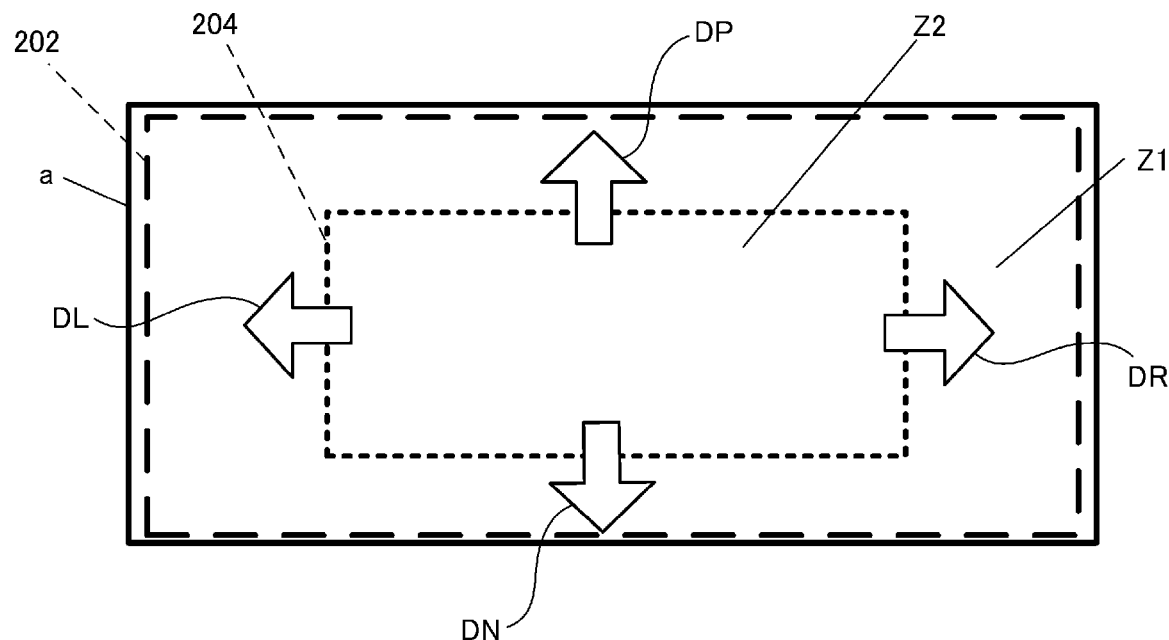
(B)
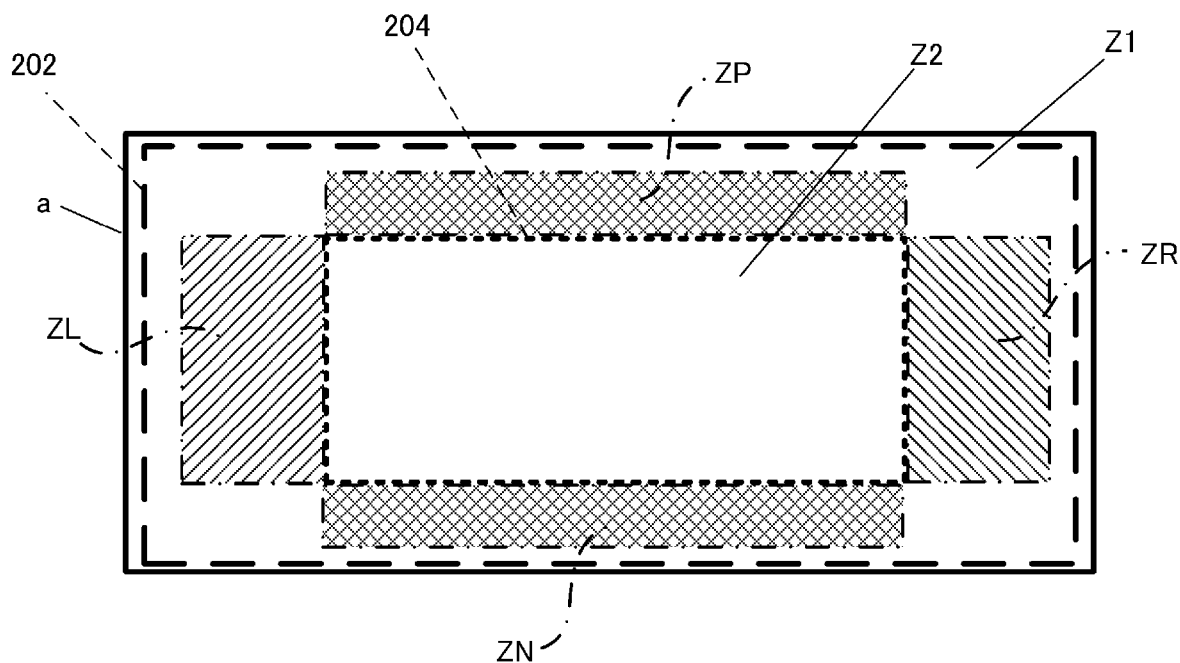

[FIG.6]
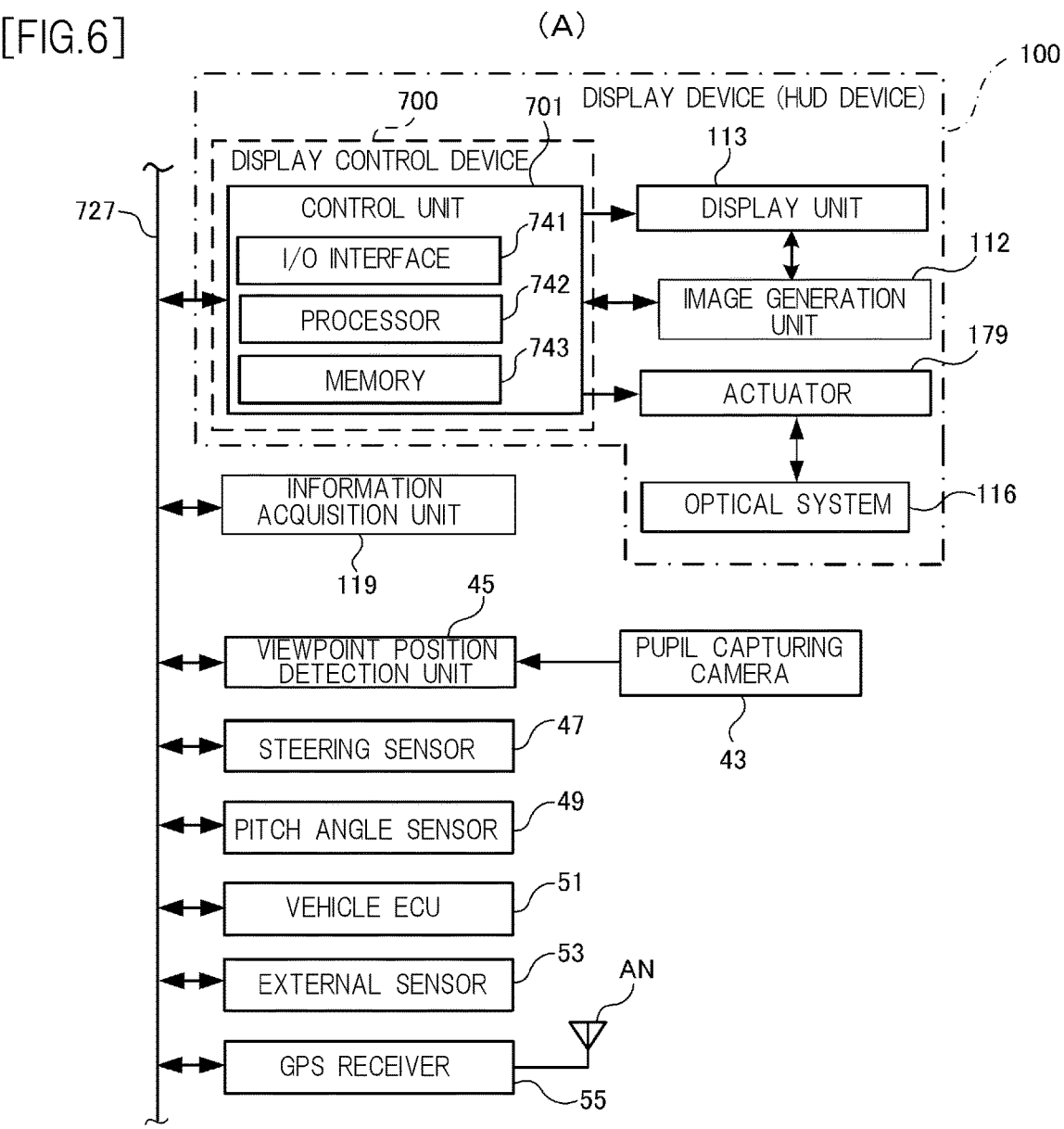
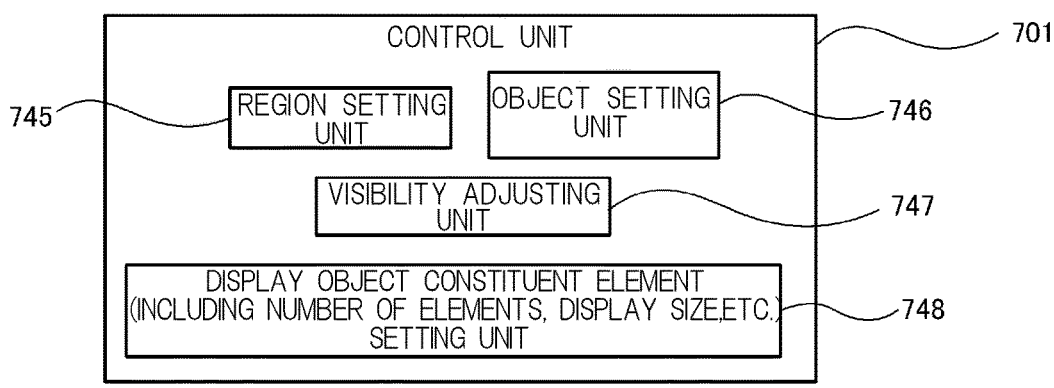

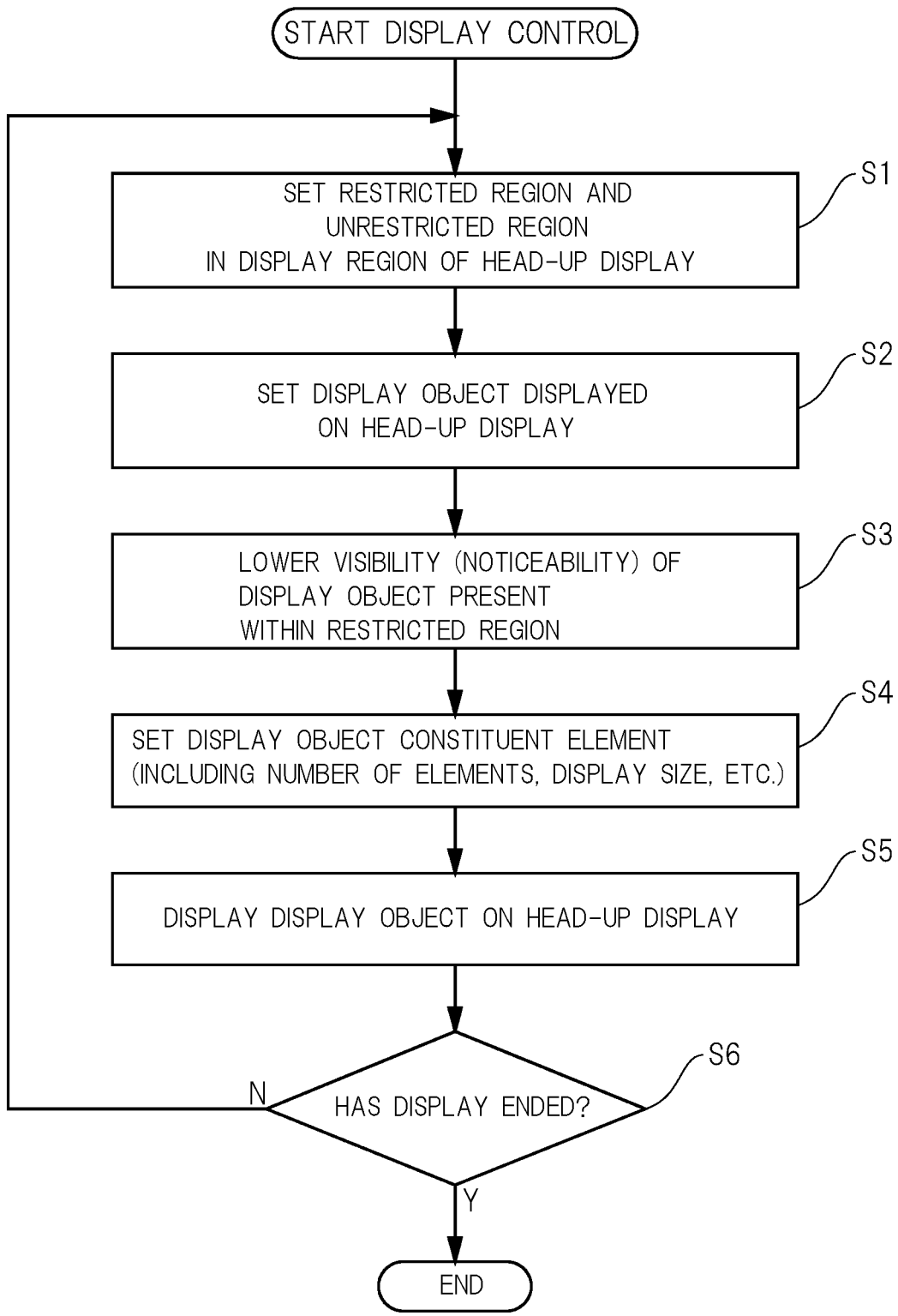

DISPLAY CONTROL DEVICE, DISPLAY DEVICE, AND DISPLAY CONTROL METHOD

CROSS-REFERENCE TO RELATED APPLICATIONS

This application is the U.S. National Phase under 35 U.S.C. § 371 of International Application No. PCT/JP2022/035828, filed on Sep. 27, 2022, which claims the benefit of foreign priority to Japanese Patent Application No. 2021-157452 filed on Sep. 28, 2021, the entire contents of each of which are hereby incorporated by reference.

TECHNICAL FIELD

The present invention relates to, for example, a display control device mounted on a vehicle such as an automobile, a display device such as a head-up display (HUD), and a display control method and the like.

BACKGROUND ART

Patent Document 1 indicates, in paragraph [0013], that "the display control means generates a guide image for a superposition display of guide information on a front windshield and displays the guide image superposed on the front windshield via the display means so that when a display object detected by the display object detection means is viewed from the inside of a vehicle cabin, the display object and the guide information overlap each other."

Patent Document 1 also indicates, in paragraph [0014], that "when the position of the display object changes beyond a set display region in which the position of the display object is preliminarily set, the display control means dims the guide image or changes the guide image from a normal image to a simple image smaller than the normal image."

PRIOR ART DOCUMENT

Patent Document

Patent Document 1: JP 2015-11666 A

SUMMARY OF THE INVENTION

Problems to be Solved by the Invention

The present inventor has clarified the following problems.

In a head-up display (HUD) device, when a display by a HUD (hereinafter, referred to as the "HUD display") is superposed on an actual view, the HUD display may sometimes obstruct a view of an actual sight from an occupant (a driver or the like).

As a measure against this problem, as described in Patent Document 2, it is considered to lower visibility (noticeability) by dimming or lessening the HUD display. However, the HUD display is made less visible due to lowering in visibility (noticeability), and a case in which an occupant feels a feeling of strangeness can also be assumed.

In other words, it is important both to prevent the HUD display from obstructing a view of an actual sight and to secure visibility (noticeability) of the HUD display to provide an easily visible display of information beneficial to an occupant. There is thus room for improvement in HUD devices in this regard.

An object of the present invention is to realize a HUD display and the like easily viewed by an occupant while preventing obstruction of a view of an actual sight to reduce a feeling of strangeness.

Other objects of the present invention will become apparent to a person skilled in the art by referring to aspects and the best mode shown below and to the accompanying drawings.

Solution to Problem

In order to facilitate understanding of the present invention, aspects according to the present invention are shown below.

In a first aspect, a display control device mounted on a vehicle and performing image display control includes a control unit for controlling a display form and a visibility level of a display object, in which the control unit can change the display form of the display object by variably controlling at least one of the number of display elements constituting the display object and the size of the display elements; and in a case where visibility lowering processing for setting the visibility level of the display object to a second visibility level lower than a first visibility level is executed, display object recognition performance improving processing is executed, the display object recognition performance improving processing involving at least one of: increasing the number of display elements constituting the display object compared with a case where the visibility level is set to the first visibility level; and expanding the size of all or some of the display elements constituting the display object compared with the case where the visibility level is set to the first visibility level.

According to the first aspect, by lowering visibility (which can be reworded as noticeability) of the display object, lowering in visibility of an actual sight (front view and the like) can be suppressed even when the display object is displayed in a position obstructing the front view of an occupant, for example.

In addition, a case in which the visual line of the occupant (viewer) is guided to the display object and visual attention to the actual sight (front view and the like) becomes insufficient hardly happens. Furthermore, increase in burden on the occupant (viewer: driver or the like) like feeling of annoyance with the display is suppressed.

Meanwhile, when the visibility level of the display object is lowered, the display object is easily found and understood by displaying the display object in a form in which the display object is composed of a larger number of elements or by displaying the display object in a form in which all or some of multiple display elements are expanded (are enlarged or have a larger area). In other words, decrease in recognition performance of the display object (image display) is suppressed.

In such a manner, according to the present aspect, by using the visibility lowering processing and the recognition performance improving processing in combination, a HUD display and the like easily viewed by an occupant can be realized, while suppressing obstruction of a view of an actual sight to reduce a feeling of strangeness.

Specifically, the image display can be made easier to find without causing the occupant to feel a feeling of strangeness, and the content of the display object is also made easier to intuitively understand, for example. For example, deviation from a traveling route and an occurrence of an accident can be surely prevented by displaying, in an easily visible manner, a display indicating a traveling route or a display warning of collision with a preceding vehicle or an obstruction, for example, while securing a natural sense of vision.

In a second aspect depending from the first aspect, the control unit may set, within a virtual display region in real space in front of the occupant of the vehicle, a first region including a part corresponding to a near actual sight and a second region including a part corresponding to a far actual sight: when the display object is displayed in the first region, the visibility level may be set to the first visibility level; and when the display object is displayed in the second region, the visibility level may be set to the second visibility level.

In the second aspect, the visibility level can be set at least either to the first visibility level or the second visibility level (first visibility level>second visibility level) when displaying the display object; and whether the visibility level is set to the first visibility level or the second visibility level is determined according to the region (display region) in which the display object is displayed.

The first region including a part corresponding to a near actual sight and the second region including a part corresponding to a far actual sight are provided as the display region.

It is said to be important to look out, while looking into the far distance, also for the near distance and surroundings and maintain a wide visual field, during driving a vehicle. However, in a case of long-distance driving in particular, visibility of a far front view is an important matter for safe driving since the time during which attention is paid to the far distance is long.

Considering this point, when the display object is displayed in the second region including a part corresponding to a far actual sight, noticeability is lowered as the second visibility level, for example (however, decrease in recognition performance is suppressed by increasing the number of display elements or by increasing the area of the display elements).

Consequently, a view of a background (a far actual sight and the like) is not obstructed, attention of an occupant (viewer) to a background is not excessively diverted, and the occupant is not caused to feel a feeling of strangeness to be stressed. Accordingly, comfortable driving can be ensured.

On the other hand, with respect to the display object displayed in the first region including a part corresponding to a near actual sight, the visibility level is set to the first visibility level to realize a display with enhanced visibility. For example, when an obstruction or the like is present in a position close to the vehicle, an accident risk is increased. However, even in such a case, it is possible to display a simple image with high visibility. Therefore, a driver can quickly take danger evasive action, for example.

In a third aspect depending from the second aspect, the control unit may set a third region within the second region: when the display object is displayed in the third region, the visibility level may be set to the first visibility level or to a visibility level which conforms to the first visibility level and is close to the first visibility level; and when the display object is displayed in a region other than the third region in the second region, the visibility level may be set to the second visibility level.

In the third aspect, the third region can be set within the second region. In this third region, the visibility level can be set to the first visibility level or to a visibility level conforming to the first visibility level. Consequently, the visibility level can be more finely set. Therefore, the visibility level can be adaptationally set to fit a driving situation and the like, for example.

In a fourth aspect depending from the second or third aspect, the control unit may make the change rate in increasing the visibility level when the display object displayed in the second region moves to the first region slower than the change rate in lowering the visibility level when the display object displayed in the first region moves to the second region.

In the fourth aspect, a case in which a change of the visibility level is required with movement of the display object is assumed.

When the display object enters the second region, it is preferable that the visibility level of the display object (display image) be quickly lowered so as not to obstruct a view of the actual sight.

On the other hand, in a case in which the display object goes out of the second region, when the visibility level is instantly raised, a case in which the occupant pays close attention to the display object, contributing distraction of attention to a front view is also assumed, for example. Therefore, the change rate in increasing the visibility level is made slow. Consequently, a case in which a driver or the like pays close attention to the display object beyond necessity hardly happens.

In a fifth aspect depending from any one of the second to fourth aspects, the control unit may make a first visibility level increasing mode for a case in which the display object displayed in the second region and related to a traveling lane of the vehicle moves to the first region different from a second visibility level increasing mode for a case in which the display object displayed in the second region and not related to a traveling lane of the vehicle moves to the first region.

The fifth aspect assumes the case in which a change of the visibility level is required with movement of the display object as in the fourth aspect described above.

Provided that, in the fifth aspect, the display object causes the visibility level increasing modes (including, for example, increasing rate of luminance and the like, and an increasing characteristic of luminance and the like with respect to time (e.g. setting of a change rate with respect to time)) to be switched according to the content (for example, whether important information pertaining to own vehicle is included or not) of the display object.

In a case in which the display object is related to a traveling lane of own vehicle, the possibility of leading to occurrence of an accident cannot be denied, for example, when the occupant does not find or understand the display object immediately. On the other hand, with respect to the display object related to a traveling lane of own vehicle, by increasing, for example, the change rate in increasing the visibility level when the display object goes out of the second region, the occupant is made more likely to find and understand the display object, enabling quick recognition.

In a sixth aspect depending from any one of the second to fifth aspects, the control unit may change the position of the second region based on first information acquired.

In the sixth aspect, the position of the second region is variably controlled. A region to which the occupant should paid attention varies according to a vehicle state, an occupant state, and a traveling environment. Considering this point, the second region can be set to a proper position according to the situation by changing the position of the second region according to a vehicle state, an occupant state, a traveling environment, and the like.

In a seventh aspect depending from the sixth aspect, the first information includes information pertaining to at least one of a staring angel, a pitching angle, positions of both eyes, and a traveling place, and the control unit may execute at least one of: detecting the traveling direction of the vehicle from the staring angle and changing the position of the second region in the direction same as the traveling direction: detecting a shake of the vehicle in the vertical direction from the pitching angle and changing the position of the second region in the direction opposite to the direction of the shake; changing the position of the second region to a higher position when the positions of both eyes are higher than a reference position, and changing the position of the second region to a lower position when the positions of both eyes are lower than the reference position; and changing the position of the second region to a position preliminarily set with respect to the traveling place.

In the seventh aspect, a vehicle state, an occupant state, a traveling environment, or the like can be detected on the basis of information pertaining to at least one of a staring angel, a pitching angle, positions of both eyes, and a traveling place, and the position of the second region can be changed based on the detection result.

For example, when an occupant steers a staring, the traveling direction of the vehicle may be detected from a detection signal from a staring sensor, and the position of the second region may be moved to the direction same as the traveling direction, because the occupant often pays attention to the traveling direction.

By virtue of detecting a shake of the vehicle in the vertical direction on the basis of information on a pitching angle and changing the position of the second region in the direction opposite to the direction of the shake, the display object displayed in the second region is prevented from going out of the second region due to the shake, for example.

By virtue of adjusting the position (height position) of the second region according to the positions (viewpoint height position) of the both eyes, the second region can be positioned in an appropriate position viewed from the occupant.

The direction to which the occupant pays attention or the like sometimes varies according to the traveling place of the vehicle. Accordingly, by virtue of adaptationally adjusting the position of the second region according to the traveling place, the display object can be stably displayed in an appropriate position in the second region.

In an eighth aspect depending from any one of the first to fifth aspects, the control unit may change the size of the second region based on the first information acquired.

In the eighth aspect, the size of the second region is changed. The effect same as the sixth aspect (the aspect in which the position of the second region is changed) described above can be obtained.

In a ninth aspect depending from the eighth aspect, the first information may include information pertaining to at least one of a staring angel, a pitching angle, positions of both eyes, and a traveling place, and the control unit may execute, based on the first information, at least one of: changing the second region to have a size larger than a reference size when the staring angle is large: changing the second region to have a size larger than the reference size when the pitching angle is large: changing the second region to have a size larger than the reference size when the positions of the both eyes are higher or lower than a reference position; and changing the size of the second region to a size preliminarily set with respect to the traveling place.

In the ninth aspect, the effect same as the seventh aspect (the aspect in which the position of the second region is changed based on the sensor information or the like) described above can be obtained.

As an example of the case of "changing the size of the second region to a size preliminarily set with respect to the traveling place," the following case may be supposed. For example, in a case of traveling in an urban area, the occupant often pays attention to a range wider than a case of a freeway or the like. Therefore, when it is detected from a detection signal from a GPS receiver that the vehicle is traveling in an urban area, the second region is set to become larger, for example. Consequently, the display object can be displayed (disposed) in an appropriate position in the enlarged second region.

In a tenth aspect, the display device includes an image generation unit generating an image, a display unit displaying the image, an optical system including an optical member that reflects display light from the image and projects same onto a projection member, and the display control device according to any one of the first to ninth aspects.

According to the tenth aspect, an image display easily viewed by an occupant can be realized while preventing obstruction of a view of an actual sight to reduce a feeling of strangeness. Therefore, for example, a convenient display device (for example, a HUD device) which is practical and highly functional is realized with safety in mind sufficiently.

In an eleventh aspect, a display control method controls a visibility level and a display form of a display object, in which the display form is changed by variably controlling at least one of the number of display elements constituting the display object and the size of the display elements; and in a case where visibility lowering processing for setting the visibility level of the display object to a second visibility level lower than a first visibility level by adjusting at least one of transmittance, chromaticness, brightness, and luminance of the display object is executed, display object recognition performance improving processing may be executed, the display object recognition performance improving processing involving at least one of: increasing the number of display elements constituting the display object compared with a case where the visibility level is set to the first visibility level; and expanding the size of all or some of the display elements constituting the display object compared with the case where the visibility level is set to the first visibility level.

According to the eleventh aspect, since the recognition performance improving processing is also executed when the visibility lowering processing is executed, appropriate visibility and recognition performance of the display image can be simultaneously achieved. This display control method is applicable also to display control of a display instrument such as a liquid crystal display or to a projection display device such as a projector, in addition to display control with a HUD device. In addition, the display control method contributes to provision of variety of display forms in a display device and realization of an image display in accordance with a driving situation.

A person skilled in the art will readily understand that the shown aspects according to the present invention may be further modified without departing from the spirit of the present invention.

BRIEF DESCRIPTION OF THE DRAWINGS

FIG. 1(A) illustrates an example of a configuration of a vehicle-mounted system (vehicle-mounted display system) including a display such as a HUD device and a liquid crystal panel, and FIG. 1(B) illustrates a display example provided by a HUD device.

FIG. 2(A) illustrates an example of display objects respectively displayed in a first region and a second region set within a display region, and FIGS. 2(B) to 2(G) each illustrate an example of display elements which may be a constituent element of the display object.

FIGS. 3(A) and 3(B) illustrate other examples of the display object displayed in each of the first region and the second region set within the display region.

FIGS. 4(A) to 4(F) illustrate other examples of the display elements which may be constituent elements of the display object.

FIG. 5(A) illustrates an example in which the position of the second region is variably controlled, and FIG. 5(B) illustrates an example in which the size of the second region is variably controlled.

FIG. 6(A) illustrates an example of a configuration of the vehicle-mounted system, and FIG. 6(B) illustrates an example of a configuration of a control unit.

FIG. 7 is a flowchart indicating an example of a control procedure of the control unit (display control device).

MODE FOR CARRYING OUT THE INVENTION

The best mode described below is used to facilitate understanding of the present invention. Accordingly, a person skilled in the art should note that the present invention is not unreasonably limited by the mode described below.

Reference is made to FIG. 1. FIG. 1(A) illustrates an example of a configuration of a vehicle-mounted system (vehicle-mounted display system) including a display such as a HUD device and a liquid crystal panel, and FIG. 1(B) illustrates a display example provided by a HUD device. The vehicle-mounted system in FIG. 1(A) includes a display device (including at least one of a display instrumental device and a HUD device) as a constituent element.

Note that the width direction (right-left direction or lateral direction) of a vehicle 1 is described as the X-direction in FIG. 1(A). The direction (vertical direction or height direction) orthogonal to the right-left direction and along a line segment orthogonal to a ground surface or a plane corresponding to the ground surface (a road surface 6 in this case) is taken as the Y-direction. The direction (direction indicating a forward-backward direction of the vehicle 1, front-back direction) along a line segment orthogonal to each of the right-left direction and the vertical direction is taken as the Z-direction. These points are also true of other drawings (FIG. 2, FIG. 3, and the like).

The display device here is a vehicle-mounted display device mounted on the vehicle 1. The vehicle-mounted display device in FIG. 1(A) has a display instrumental device (including a control unit 140, a display instrument control unit 107, and a display instrument 108 such as a liquid crystal panel) and a head-up display (HUD) device 100 (including a control unit 140 and a device main body 120).

The HUD device 100 is installed inside a dashboard 41, for example. The device main body 120 has a display instrument 150 such as a liquid crystal panel, a screen (display unit) 160 provided with a display plane 164, and a curved mirror (such as a concave mirror) 170 provided with a light reflection plane 179. The curved mirror (such as a concave mirror) 170 reflects light (display light) from the screen 160 and projects the display light K onto a windshield (projection member) 2 provided to the vehicle 1. Part of the display light K is reflected by the windshield (projection member) 2 and enters a viewpoint (eye) A of an occupant (such as a driver, sometimes referred to as a viewer).

Apparent light rays E1 to E3 corresponding to respective incident light rays form an image at an imaging point in front of the viewer, and a virtual image (image) is displayed on a virtual image display plane PS thereby.

The virtual image display plane 9 is a virtual (apparent) plane which is set in real space in front of the occupant (viewer such as a driver) in response to the display plane 164 of the screen 160.

Examples of the virtual image display plane 9 include an elevation plane a perpendicular to the road surface 6, inclined planes b and c inclined with respect to the road surface 6, a road surface-superposed plane d superposed on the road surface 6, and a plane e a portion of which closer to the occupant (viewer) is an elevation plane (including a pseudo elevation surface) and a portion of which far from the occupant (viewer) is an inclined plane. The display distance of the virtual image varies depending on the display position on the virtual display plane, and a 3D display is thus possible, in a display using a plane other than the elevation plane a.

Note that the configuration of the HUD device described above is an example, and the present invention can be applied also to various HUD devices such as a 3D HUD device using a lenticular lens or the like, and a parallax 3D HUD device. The types of the HUD device are not limited. The present invention can be applied also to a case of an AR display using a display instrument (such as a liquid crystal panel) 108.

Reference is made to FIG. 1(B). In FIG. 1(B), parts in common with those in FIG. 1(A) are designated by identical reference signs. A HUD display region (sometimes referred to simply as the display region) 202 on a virtual display plane (for example, the virtual display plane a in FIG. 1(A)) is provided in front of a driver (viewer) 5, who is the occupant.

The HUD display region (display region) 202 is divided into a first region Z1 and a second region Z2. The second region Z2 is a region inside the dotted rectangle 204. The first region Z1 is a region other than the first region Z1 in the display region 202.

The first region Z1 is a region including a portion corresponding to an actual sight (front view) near (closer to) the occupant (driver or the like) 5, and the second region Z2 is a region including a portion corresponding to an actual sight (front view) far (farther) from the occupant (driver or the like) 5.

Although the first region Z1 and the second region Z2 are rectangle regions in FIG. 1(B), the shapes of the first region Z1 and the second region Z2 are not limited thereto.

Although the first region Z1 and the second region Z2 are provided inside the HUD display region 202 in the example of FIG. 1(B), the positions of the first region Z1 and the second region Z2 are not limited thereto. For example, the whole area of the HUD display region 202 may be the first region, and a display plane of the display instrument 108 such as a liquid crystal display panel may be the second display region.

A third region Z3 (the region inside the dotted rectangle in FIG. 1(B)) may be further provided inside the second region Z2.

When the first region Z1 and the second region Z2 are set, the visibility level can be changed according to whether a display object OB is inside the first region Z1 or inside the second region Z2. Control of the visibility level can be realized by adjusting at least one of transmittance, chromaticness, brightness, and luminance or the display object, for example.

Since the first region Z1 includes the portion corresponding to a near actual sight, when a "target to notice" (alternatively, a "target to watch out for" or a "target to view") such as an obstruction exists in the first region Z1, an accident is often highly likely to be caused, for example. Therefore, it is preferable that noticeability of the display object such as an awareness promoting display or a warning display to the occupant 5 be enhanced by setting visibility high. In view of this point, the control unit 140 sets the visibility level to a first visibility level for a display object (the display object OB1 in FIG. 1(B)) displayed in the first region Z1.

Since the second region Z2 includes the portion corresponding to a far actual sight, good view (long-distance sight at a glance) for the occupant 5 is required to be ensured, or strangeness or annoyance caused when the display object obstructs a view of the actual sight is required to be suppressed. In view of this point, the control unit 140 preferably sets the visibility level to a second visibility level lower than the first visibility level for a display object (display objects OB2 and OB3 in FIG. 1(B)) disposed in the second region Z2.

When a third region Z3 is provided, the control unit 140 can also set the visibility level to, for example, the first visibility level for a display object OB4 displayed in the third region Z3. Consequently, visibility can be more finely controlled in accordance with a driving situation, for example.

Processing executed by the control unit 140 for setting the visibility level for the display object to the second visibility level lower than the first visibility level (or processing for changing visibility to be lower) is referred to as "visibility lowering processing" herein.

However, when the visibility lowering processing is executed, it is undeniable that recognition performance (it can be reworded as distinguishability, perceptibility, and the like) of the display object is lowered.

Therefore, in the present embodiment, decrease in recognition performance is suppressed by extincting "display object recognition performance improving processing" together. This display object recognition performance improving processing is, for example, "processing that is executed when visibility lowering processing for setting the visibility level of the display the second visibility level lower than the first visibility level is executed and that involves, for example, at least one of: increasing the number of display elements constituting the display object compared with a case where the visibility level is set to the first visibility level; and expanding the size of all or some of the display elements constituting the display object compared with the case where the visibility level is set to the first visibility level."

In FIG. 1(B), as shown by the arrow AR1, there may be a case in which the display object OB2 displayed in the second region Z2 moves to the position of the display object OB1 in the first region Z1. As shown by the arrow AR2, there may be a case in which the display object OB1 displayed in the first region Z1 moves to the position of the display object OB2 in the second region Z2. In these cases, visibility for the moved display object is required to be changed. The changing rate for visibility thereof may not be uniform, and it is sometimes preferable that the changing rate differ between the movement in the direction of the arrow AR1 and the movement in the direction of the arrow AR2.

Even in a case in which the display object OB2 in the first region Z1 moves to the position of the display object OB1 in the second region Z2 (moves in the direction of the arrow AR1), it may be sometimes preferable that changing characteristics (such as a shape of a characteristic line indicating, for example, a changing rate to time) of visibility be adequately set, as appropriate, according to whether the display object OB2 is a display (display with high importance in relation to a driving situation, in a broad sense) showing information pertaining to a traveling lane, for example.

Hereinafter, these points will be described in sequence. Then, reference is made to FIG. 2. FIG. 2(A) illustrates an example of display objects respectively displayed in the first region and the second region set within the display region, and FIGS. 2(B) to 2(G) each illustrate an example of display elements which may be a constituent element of the display object. In FIG. 2, parts in common with those in FIG. 1 are designated by identical signs.

In FIG. 2(A), the vehicle (own vehicle) 1 is traveling on a straight rode at 50 km/h. A vehicle speed display SP (display indicating "50 km/h") is disposed on the lower side of the center of the first region Z.

The signs W1 and W5 each represent a borderline between a road surface and a sidewalk, and signs W2 to W4 represent white lines on the road surface.

A target to notice (for example, an obstruction (such as a fallen object), a depression part on a road surface, and the like) Q1 is present ahead in the lower left when viewed from the driver 5. In addition, a preceding vehicle PV to pay attention is present in front.

The HUD device 100 displays awareness promoting displays (or warning displays) pertaining to the target to notice Q1 and the preceding vehicle PV, respectively.

The awareness promoting display (warning display) displayed on the HUD device 100 is a display (which is sometimes referred to as a "combined display," a "combination display of multiple elements," a "compound image," or the like herein) which can be obtained by combining display elements (or display object constituent elements) as illustrated in FIGS. 2(B) to 2(G) and used.

The display element 300 illustrated in FIG. 2(B) is a square bracket as a frame display disposed below the awareness promoting display (preceding vehicle PV) and is sometimes referred to as the "lower square bracket" herein.

The display element 302 illustrated in FIG. 2(C) is a square bracket (upper square bracket) as a frame display disposed above the awareness promoting display (preceding vehicle PV).

The display element 304 illustrated in FIG. 2(D) is an exclamation mark icon (exclamation mark) as the awareness promoting display (or an intensified display).

The display element 301 illustrated in FIG. 2(E) is a square bracket (left square bracket) as a frame display disposed on the left of the awareness promoting display (preceding vehicle PV).

The display element 303 illustrated in FIG. 2(F) is a square bracket (right square bracket) as a frame display disposed on the right of the awareness promoting display (preceding vehicle PV).

The display element 306 illustrated in FIG. 2(G) is the awareness promoting display (a warning display or an intensified display) in a sign form using characters.

In FIG. 2(A), the display elements represented in FIGS. 2(B) to 2(D) are used. The display element 300 of the lower square bracket (as illustrated in FIG. 2(B)) is displayed (disposed) below the target to notice (an obstruction or the like) Q1. The display element 300 is positioned in the first region Z1, and the visibility level thereof is set to the "first visibility level" which is a higher visibility level.

The display element 302 of the upper square bracket illustrated in FIG. 2(C) is displayed (disposed) above the preceding vehicle PV, and the display element 300 of the lower square bracket illustrated in FIG. 2(B) is displayed (disposed) below the preceding vehicle PV. The exclamation mark icon (exclamation mark display) 304 illustrated in FIG. 2(D) is displayed above the second display element 302.

The display elements 300, 302, and 304 are positioned in the second region Z2, and the visibility level of each of the display elements 300, 302, and 304 is set to the "second visibility level" lower than the first visibility level.

For example, although part of the display element 300 overlaps the white line W2 in the part DS1 enclosed by a dashed circle in FIG. 2(A), visibility of the white line W2 is not completely hindered, and a natural sense of vision can be ensured without strangeness, since visibility of the display element 300 is lowered by the visibility lowering processing.

In addition, although part of the display element 302 overlaps the white line W3 in the part DS2 enclosed by a dashed circle, visibility of the white line W3 is not completely hindered, and a natural sense of vision can be ensured without strangeness, since visibility of the display element 302 is lowered by the visibility lowering processing.

It is considered that the exclamation mark icon 304 often overlaps a far actual sight. However, since visibility of the exclamation mark icon 304 is lowered, no particular problem arises in visually observing the far actual sight (front view).

Meanwhile, since the display element 300 and the display element 302 are disposed below and above the preceding vehicle PV, respectively, as a pair and the exclamation mark icon 304 is further added, noticeability for promoting awareness is enhanced although visibility of the display elements 300 and 302 is lowered.

In other words, since the number of display elements constituting the awareness promoting mark is increased (the number of display elements is "3") through distinguishability improving processing, necessary recognition performance is secured.

Meanwhile, although only the display element 300 is disposed below the target to notice Q1 (the display element 300 is used singly), visibility thereof is maintained at a high level. Therefore, necessary awareness promoting performance (noticeability) is secured, while ensuring a sense of vision without strangeness provided by a simple display.

In such a manner, according to the display example of FIG. 2(A), lowering in visibility of an actual sight (front view and the like) can be suppressed by lowering visibility (which can be reworded as noticeability) of the display object (the awareness promoting mark composed of the combination of the exclamation mark icon 304 and the pair of the display element 300 and the display element 302), even when the display object is displayed in a position obstructing front vision of the occupant, for example.

In addition, a case in which the visual line of the occupant (viewer) is guided to the display object and visual attention to the actual sight (front view and the like) becomes insufficient hardly happens. Furthermore, increase in burden on the occupant (viewer: driver or the like) like feeling of annoyance with the display is also suppressed.

Meanwhile, when the visibility level of the display object is lowered, the display object is easily found and understood by representing the display object in a form, for example, in which the display object is composed of a larger number of elements. In other words, decrease in recognition performance of the display object (image display) is suppressed.

That is, by virtue of using the visibility lowering processing and recognition performance improving processing in combination, a HUD display easily viewed by an occupant and the like can be realized, while suppressing obstruction of a view of an actual view to reduce a feeling of strangeness.

Specifically, the image display can be made easier to find without causing the occupant to feel a feeling of strangeness, and the content of the display object is also made easier to intuitively understand, for example. For example, deviation from a traveling route and an occurrence of an accident can be surely prevented by displaying, in an easily visible manner, a display indicating a traveling route, a display warning of collision with a preceding vehicle or an obstruction, or the like, while securing a natural sense of vision.

Then, reference is made to FIG. 3. FIGS. 3(A) and 3(B) illustrate other examples of the display objects respectively displayed in the first region and the second region set within the display region. In FIG. 3, parts in common with those in previously described drawings are designated by identical signs.

In FIG. 3(A), the display object indicating the preceding vehicle PV is composed of the display element 300 of the lower square bracket and the exclamation mark icon 304 (the number of display elements is "2"). However, in FIG. 3(A), distinguishability is improved by increasing the size (area) of the lower square bracket display element 300. Accordingly, distinguishability similar to that in the example of FIG. 2(A) is secured.

In FIG. 3(B), the display object indicating the preceding vehicle PV is composed of the display element 300 of the lower square bracket, the display element 302 of the upper square bracket, and the exclamation mark icon 304 (the number of display elements is "3"). In addition, distinguishability is further improved by increasing the size (area) of each of the lower square bracket display element 300 and the upper square bracket display element 302 in FIG. 3(B). Accordingly, distinguishability is improved more than the examples of FIG. 2(A) and FIG. 3(A).

In such a manner, when visibility lowering processing for setting the visibility level to the second visibility level lower than the first visibility level is executed, good view (good sense of vision) in relation to an actual sight and distinguishability of the HUD display can be simultaneously achieved by executing display object recognition performance improving processing involving at least one of: increasing the number of display elements constituting the display object compared with a case where the visibility level is set to the first visibility level; and expanding the size of all or some of the display elements constituting the display object compared with the case where the visibility level is set to the first visibility level. In other words, when the visibility level of the display object is lowered, the display object is easily found and understood by representing the display object in a form in which the display object is composed of a larger number of elements or by representing the display object in a form in which all or part of multiple display elements are expanded (are enlarged or have a larger area); and decrease in recognition performance of the display object (image display) is suppressed.

Then, reference is made to FIG. 4. FIGS. 4(A) to 4(F) illustrate other examples of the display elements which may be constituent elements of the display object.

FIGS. 4(A) and 4(B) each illustrate an example of a sign display that may be composed of a combination of multiple display elements.

FIG. 4(A) illustrates a display element 330 as the central part of a speed limit sign with high visibility (high noticeability) used in the first region Z1.

FIG. 4(B) illustrates a speed limit sign as a combined display (a combination display of multiple elements or a compound image) composed of five display elements 330 and 331 to 334 with low visibility (low noticeability) used in the second region Z2. In the example of FIG. 4(B), four display elements (having a partial circular arc shape) 331 to 334 composing the peripheral part are disposed around the display element (having a circle shape) 330 as the central part.

FIGS. 4(C) and 4(D) each illustrate an example of an intensified display intensifying a landmark, a destination point, or the like (designated by the sign OE) serving as a landmark in driving, for example. This intensified display has, for example, circles arranged around the destination OE as display elements.

FIG. 4(C) is an intensified display that may be used in the first region Z1. This intensified display is composed of six circle (small circle) display elements M1 to M4 with high visibility (high noticeability).

FIG. 4(D) is an intensified display that may be used in the second region Z2. This intensified display is composed of eight circle (small circle) display elements M1 to M7 with low visibility (low noticeability).

FIGS. 4(E) and 4(F) each illustrate a display example as a navigation display. FIG. 4(E) is an arrow display (combined display) that may be used in the first region Z1. This arrow display (combined display) is composed of an arrow graphic constituting a tip end part (a display element of the tip end part) N1' and triangle graphics constituting a base end part (display elements of the base end part) N2' and N3'. The first visibility level, which is a high visibility level, is set as visibility.

FIG. 4(E) is an arrow display (combined display) that may be used in the second region Z2. This arrow display is composed of an arrow graphic constituting a tip end part (a display element of the tip end part) N1 and triangle graphics constituting a base end part (display elements of the base end part) N1 to N5.

When comparing FIG. 4(E) and FIG. 4(F), it is found that the shapes of the display elements constituting the respective arrows differ from each other. In such a manner, the shapes of display elements may be appropriately changed and colors and designs thereof may be appropriately changed so as to realize displays appropriate to displays (for example, a display improving appearance as a whole or adjusting the entire size) in respective regions. Such modifications are also included in embodiments of the present invention.

Next, FIG. 1(B) referred previously will be referred again. In FIG. 1(B), the third region Z3 is set inside the second region Z2. In this third region Z3, first visibility level or visibility conforming to the first visibility level can be set for the display object OB3. Consequently, the visibility level can be more finely set. Therefore, the visibility level can be adaptationally set to fit a driving situation and the like, for example.

In FIG. 1(B), the control unit 140 sets the change rate in increasing the visibility level when the display object OB2 displayed in the second region Z2 moves to the position of the display object OB1 in the first region Z1 lower than the change rate in decreasing the visibility level when the display object OB1 displayed in the first region Z1 moves to the position of the display object OB2 in the second region Z2. Note that a case in which visibility is linearly changed with respect to time is assumed herein. However, the present invention is not limited to this case, and curvilinear change characteristics may be applied.

In a case where the display object displayed in the first region (first display region) Z1 enters the second region Z2, it is preferable that the visibility level of the display object (display image) be quickly lowered so as not to obstruct a view of an actual sight.

On the other hand, in a case in which the display object displayed in the second region (second display region) Z2 goes out of the second region Z2, when the visibility level is instantly raised, a case in which the occupant (driver 5) pays close attention to the display object, contributing distraction of attention to a front view is also assumed, for example. Therefore, the change rate in increasing the visibility level is made slow. Consequently, a case in which a driver or the like pays close attention to the display object beyond necessity hardly happens.

In FIG. 1(B), the control unit 140 may make a first visibility level increasing mode for a case in which the display object (display object with more important information pertaining to a driving situation, in a broader sense) related to a traveling lane of the vehicle 1 and displayed in the second region Z2 moves to the first region Z1 different from a second visibility level increasing mode for a case in which the display object (for example, a display object including information not pertaining to a driving situation or including less important information pertaining to a driving situation) displayed in the second region Z2 and not related to a traveling lane of the vehicle 1 moves to the first region Z1.

Examples of the display object related to a traveling lane include an arrow display for navigation indicating the traveling direction of own vehicle, and a warning display for a case in which a vehicle suddenly interrupts the traveling lane in front of own vehicle. Various sign displays and the like can also be seen as displays related to a traveling lane.

In other words, the visibility level increasing modes (including, for example, an increasing rate of luminance and the like, and an increasing characteristic of luminance and the like with respect to time (e.g. setting of a change rate with respect to time)) are switched according to the content (for example, whether important information pertaining to own vehicle is included or not) of the display object.

In a case in which the display object is related to a traveling lane of own vehicle, the possibility of leading to occurrence of an accident cannot be denied, for example, when the occupant does not find or understand the display object immediately. On the other hand, with respect to the display object related to a traveling lane of own vehicle, by increasing, for example, the change rate in increasing the visibility level when the display object goes out of the second region, the occupant is made more likely to find and understand the display object, enabling quick recognition.

Then, reference is made to FIG. 5. FIG. 5(A) illustrates an example in which the position of the second region is variably controlled, and FIG. 5(B) illustrates an example in which the size of the second region is variably controlled.

In FIG. 5(A), the control unit 140 changes the position of the second region Z2 on the basis of first information acquired. In other words, the position of the second region Z2 (in other words, the position of the dotted graphic (rectangle) 204 determining the boundary of the second region Z2) is variably controlled. In FIG. 5(A), the directions in which the position is changed are represented by arrows DL, DR, DP, and DN.

A region (front region in real space) to which the occupant should paid attention varies according to a vehicle state, an occupant state, and a traveling environment. Considering this point, the second region can be set to a proper position according to the situation by changing the position of the second region according to a vehicle state, an occupant state, a traveling environment, and the like.

Information including a piece of information pertaining to at least one of a "staring angel," a "pitching angle," "positions of both eyes," and a "traveling place" can be supposed as the first information, for example.

For example, the control unit 140 may execute at least one of: detecting the traveling direction of the vehicle from the staring angle and changing the position of the second region in the direction same as the traveling direction; detecting a shake of the vehicle 1 in the vertical direction from the pitching angle and changing the position of the second region in the direction opposite to the direction of the shake: changing the position of the second region Z2 to be higher than a reference position when the positions of both eyes are higher than the reference position, and changing the position of the second region Z2 to be lower than the reference position when the positions of both eyes are lower than the reference position; and changing the position of the second region Z2 to a position preliminarily set with respect to the traveling place.

In other words, the control unit 140 may detect the vehicle state, the occupant state, the traveling environment, and the like on the basis of information pertaining to at least one of a staring angel, a pitching angle, positions of both eyes, and a traveling place, and may change the position of the second region on the basis of the detection result thereof.

For example, when an occupant steers a staring, the traveling direction of the vehicle 1 may be detected from a detection signal from a staring sensor, and the position of the second region Z2 may be moved to the direction same as the traveling direction, because the occupant often pays attention to the traveling direction.

By virtue of detecting the shake of the vehicle 1 in the vertical direction on the basis of information on a pitching angle and changing the position of the second region Z2 in the direction opposite to the direction of the shake, the display object displayed in the second region Z2 is prevented from going out of the second region Z2 due to the shake, for example.

By virtue of adjusting the position (height position) of the second region Z2 according to the positions (viewpoint height position) of both eyes, the second region Z2 can be positioned in an appropriate position viewed from the occupant 5.

The direction to which the occupant 5 pays attention and the like sometimes varies according to the traveling place of the vehicle 1. Accordingly, by virtue of adaptationally adjusting the position of the second region Z2 according to the traveling place, the display object can be stably displayed in an appropriate position in the second region Z2.

In FIG. 5(B), the control unit 140 may change (adjust) the size of the second region Z2 on the basis of the acquired first information. In FIG. 5(B), expandable regions are depicted as the regions ZL, ZR, ZP, and ZN (all of the regions are hatched).

The effect same as the example of FIG. 5(A) (the example in which the position of the second region Z2 is changed) can be obtained by appropriately changing the size of the second region Z2.

The first information may include information pertaining to at least one of a staring angel, a pitching angle, positions of both eyes, and a traveling place. The control unit 140 may execute, on the basis of the first information, at least one of: changing the size of the second region to be larger than a reference size, when the staring angle is large: changing the size of the second region to be larger than a reference size, when the pitching angle is large; changing the size of the second region to be larger than a reference size, when the positions of both eyes is higher or lower than a reference position; and changing the size of the second region to a size preliminarily set with respect to the traveling place.

The effect same as the example of FIG. 5(A) (the example in which the position of the second region Z2 is changed on the basis of sensor information and the like) can be obtained in the example of FIG. 5(B).

As an example of the case of "changing the size of the second region to a size preliminarily set with respect to the traveling place," the following case may be supposed. For example, in a case of traveling in an urban area, the occupant often pays attention to a range wider than a case of a freeway or the like. Therefore, when it is detected from a detection signal from a GPS receiver that the vehicle is traveling in an urban area, the second region is set to become larger, for example. Consequently, the display object can be displayed (disposed) in an appropriate position in the enlarged second region.

Then, reference is made to FIG. 6. FIG. 6(A) illustrates an example of a configuration of the vehicle-mounted system, and FIG. 6(B) illustrates an example of a configuration of the control unit.

In FIG. 5(A), the vehicle-mounted system has a HUD device (display device, in a broad sense) 100, an information acquisition unit 119, a pupil capturing camera 43, a viewpoint position detection unit 45, a staring sensor 47, a pitch angle sensor 49, a vehicle ECU 51, an external sensor 53, and a GPS receiver (including an antenna AN) 55.

The HUD device 100 has a display control device 700. The display control device 700 has a control unit 701. The control unit 701 has an I/O interface 41, at least one processor 742, and a memory 743.

The HUD device 100 also has an image generation unit 112, a display unit 113, an optical system 116, and an actuator 179 driving an optical component constituting the optical system 116 to change the position and the like. The information acquisition unit 119 acquires, via a communication bus 727, information (first information) obtained from various sensors and the like. The information acquisition unit 119 may be provided inside the HUD device 100.

As described above, the HUD device 100 presents, to the occupant 5, information beneficial for vehicle driving, for example, by projecting a display image (display light of an image) onto a windshield (front window or the like) 2 of the vehicle (own vehicle) 1 or onto a combiner or the like provided between the windshield 2 and the occupant to display the display image.

The control unit 701 (or the processor 742) executes the processing flow described later to perform control for improving distinguishability so that the occupant 5 can find and understand the display without any problem, even when visibility of the display is lowered in order to avoid increase in burden on the occupant 5, for example.

The external sensor 53 detects the position and content of an object such as another vehicle, a foot passenger, and a load traffic sign present in an external environment of the vehicle.

The staring sensor 47 detects the steering angle of the staring. The pitch angle sensor 49 detects the posture of the vehicle 1 in the pitching direction.

The viewpoint position detection unit 45 detects the position of the eyes of the occupant 5, the eye direction, and the like, on the basis of an image captured by the pupil (or face) capturing camera 43, for example.

The GPS receiver 55 receives a wireless signal from a GPS satellite and detects the position of the vehicle 1.

There are multiple kinds of the vehicle ECU 51 such as an engine ECU and a meter ECU, and the vehicle ECU 51 operates the actuator on the basis of information from a sensor and sends, as appropriate, required information to the control unit 701 and another vehicle ECU.

In FIG. 5(B), the control unit 701 (or the processor 702) has, as functional blocks, a region setting unit 745, an object setting unit 746, a visibility adjusting unit 747, and a display object constituent element (including the number of elements, display size, and the like) setting unit 748.

Then, reference is made to FIG. 7. FIG. 7 is a flowchart indicating an example of a control procedure of the control unit (display control device).

In step S1, the first region Z1 and the second region Z2 (the third region Z3, if needed) are set in a display region (for example, the sign 204 in FIG. 1(B)) of the head-up display (HUD) device 100.

As described previously, the second region (B) can be set as a region in which a display object (the display objects OB2 and OB3 in FIG. 1(B)), which is considered to be often overlapped with a relatively far actual sight in the display region 204, is disposed.

It is said to be important to look out, while looking into the far distance, also for the near distance and surroundings and maintain a wide visual field, during driving a vehicle 1. However, in a case of long-distance driving in particular, visibility of a far front view is an important matter for safe driving since the time during which attention is paid to the far distance is long. Considering this point, by virtue of lowering visibility (noticeability) of a display object (OB2, OB3) disposed in the second region Z2 in step S3 described later, a view of a background is not obstructed, attention of the occupant to a background is not excessively diverted, and the occupant is not caused to feel a feeling of strangeness with the background and stressed, and comfortable driving can thus be ensured.

In addition, as described previously, the region to be set as the second region Z2 also depends on a vehicle state, an occupant state, and a traveling environment. Therefore, the second region Z2 may be determined on the basis of detection information obtained from the steering sensor or the pitch angle sensor, viewpoint position information, a detection signal from the GPS receiver, or the like.

Another sensor may be used in detecting a vehicle state, an occupant state, and a traveling environment, and another piece of information may be used in determining the second region Z2. For example, when the occupant steers a staring, the traveling direction of the vehicle 1 may be detected from a detection signal from the steering sensor, and the position of the second region Z2 may be moved to the direction same as the traveling direction, because the occupant often pays attention to the traveling direction.

In a case of traveling in an urban area, the occupant often pays attention to a range wider than a case of a freeway or the like. Therefore, when it is detected from a detection signal from the GPS receiver that the vehicle is traveling in an urban area, the second region Z2 may be set to become larger.

In the display region (HUD display region) 204, a region not set as the second region Z2 may be set as the first region Z1.

Although the first region Z1 and the second region Z2 are each set as one rectangle (square) region in FIG. 1(B) and the like, multiple second regions Z2 may be set, and the shapes of the first region Z1 and the second region Z2 may each be a shape other than a rectangle (square), for example.

Thereafter, a display object (for example, display objects OB1 to OB4 in FIG. 1(B)) displayed on the HUD device 100 is set in step S2.

For example, when a possibility of collision with a preceding vehicle or an obstruction is assumed from a detection signal from the external sensor, an alert for collision with a preceding vehicle or an obstruction can be set as a display object.

As illustrated in FIG. 2(A), the collision alert display object can be composed of a combination of a frame (lower square bracket) 300 disposed below an object (preceding vehicle PV), a frame (upper square bracket) 302 disposed above the object (preceding vehicle PV), and an awareness promoting display or an intensified display (exclamation mark display 304 or the like) disposed above the frame (upper square bracket) 302, for example.

In addition to the collision alert, information such as vehicle speed sent from the vehicle ECU is also set as the display object. For example, in the example of FIG. 2(A), the vehicle speed display object SP may be composed of one element (display element).

In addition, as described previously, the number of constituent elements of each display object, the size (area) thereof, the shape and design thereof, or the content (for example, whether an icon or characters are used for information communication, or the like) thereof may be changed, as appropriate. The example shown previously is one example, and the present invention is not limited thereto.

Thereafter, visibility (noticeability) of the display object (for example, the display objects OB2 and OB3 in FIG. 1(B)) the display position thereof is within the second region is lowered, in step S3.

Lowering of visibility (noticeability) is realized by making the image (virtual image) low luminance, decreasing the size, making the contrast low contrast, changing the color from a primary color to a pale color, shortening the image display duration period, for example. However, these are examples and the present invention is not limited thereto.

Note that, extent to which visibility (noticeability) is lowered may be varied according to the display position of the display object, for example. For example, when the display object is displayed in a position to which attention is paid for a long time during driving, the extent to which visibility (noticeability) is lowered may be increased.

In contrast thereto, the extent to which visibility (noticeability) is lowered may be decreased as the display position becomes closer to an end of the second region Z2, that is, as the display position becomes closer to the first region.

While visibility (noticeability) is lowered when the display object moves from the first region to the second region, and visibility (noticeability) is enhanced when the display object moves from the second region to the first region, change rates in lowering and enhancing visibility (noticeability) may be varied.

For example, the change rate in enhancing visibility may be made slower than the change rate in lowering visibility. When visibility is instantly raised, there is a possibility of leading to occurrence of an accident since the occupant pays close attention to the display object. Close attention to the display object can be prevented from being paid beyond necessity by slowing the change rate in enhancing visibility. However, in a case in which the display object is related to a traveling lane of own vehicle, there is a possibility of leading to occurrence of an accident when the display object is immediately found and understood. Therefore, the change rate in enhancing visibility may be made faster when the display object moves from the second region to the first region.

Thereafter, constituent elements of the display object are set, in step S4. When the display object is present within the second region, constituent elements as many as or more than the constituent elements present in the first region may be set. Note that, when the numbers of constituent elements are the same, it preferable that processing for making the size of the display elements larger be executed, for example, so as to improve distinguishability.

For example, in the example of FIG. 2(A), all constituent elements may be set for the collision alert display object when the collision alert display object is present in the second region. Meanwhile, when the collision alert display object is present in the first region, only one constituent element may be set for the collision alert display object, for example.

Incidentally, with respect to a display (non-superposition display) without the possibility of being superposed on an actual sight, indicating a state of the vehicle such as vehicle speed, constituent elements may be set as in the aspect illustrated in FIG. 2(A), for example, regardless of whether the display is present in the first region or the second region.

Thereafter, the display object is displayed on the head-up display (HUD) device 100, in step S5. For example, the display as in FIG. 2(A), 3(A), or 3(B) is represented.

When these processing flows are repeatedly executed, the occupant can find and understand the display without any problem, even when visibility (noticeability) of the display object is lowered in order to avoid increase in burden on the occupant.

As described above, according to the present embodiment, a HUD display easily viewed by the occupant can be realized, while suppressing obstruction of a view of an actual sight to reduce a feeling of strangeness.

Note that in the above description, the representations "first region" and "second region" are used for the sake of convenience and can be reworded.

For example, the "first region" may be referred to as, for example, a "non-restrictive region" having a high freedom degree for display without any particular restriction (condition) on the number of display elements, the size of the display elements, and the like, or as a "reduced restriction (condition) region" for which the "display restriction (condition)" is reduced, for example.

In addition, the "second region" may be referred to as, for example, a "restrictive region" on which a predetermined restriction (or condition) on the number of display elements, the size of the display elements, and the like is imposed, or a "restriction-weighed region to which a restriction (condition) is imposed without reduction.

In the present specification, the term vehicle can be understood as a conveyance in a broad sense. With respect to terms (for example, the sign and the like) pertaining to navigation shall be understood in a broad sense, taking also the viewpoint of navigation information in a broad sense useful for traveling of a vehicle into consideration, for example. The HUD device and the display instrumental device (and the display device in a broad sense) include those used as a simulator (for example, a simulator for an aircraft, a simulator as a game device, and the like).

The present invention is not limited to the above-described exemplary embodiments, and a person skilled in the art would easily modify the above-described exemplary embodiments to the range encompassed by the scope of claims.

DESCRIPTION OF REFERENCE NUMERALS

1 Vehicle (own vehicle)
2 Windshield (projection member)
6 Road surface (including an equivalent surface such as a ground surface and a floor surface)
41 Dashboard
100 HUD device
140 Control unit (processor)
202 Display region (HUD display region) of HUD device (display device)
204 Borderline of second region (or a figure determining the boundary)
300-303 Display elements as a frame display
304 Awareness promoting display (intensified display, exclamation mark icon, exclamation mark display)
306 Warning display using characters
PV Preceding vehicle
Q1 Target to notice (obstruction, target to view, target to be warned)
Z1 First region (non-restrictive region)
Z2 Second region (restrictive region)
Z3 Third region
SP Vehicle speed display
OB1-OB4 Display object (HUD display, image, virtual image)

The invention claimed is:

1. A display control device mounted on a vehicle and performing image display control, the display control device comprising a control unit for controlling a display form and a visibility level of a display object, wherein:
the control unit changes the display form of the display object by variably controlling at least one of the number of display elements constituting the display object and a size of the display elements;
in a case where visibility lowering processing for setting the visibility level of the display object to a second visibility level lower than a first visibility level is executed, display object recognition performance improving processing is executed, the display object recognition performance improving processing involving at least one of:
  increasing the number of display elements constituting the display object compared with a case where the visibility level is set to the first visibility level; and
  expanding the size of all or some of the display elements constituting the display object compared with the case where the visibility level is set to the first visibility level;
the control unit sets, within a virtual display region in real space in front of an occupant of the vehicle, a first region including a part corresponding to a near actual sight and a second region including a part corresponding to a far actual sight;
when the display object is displayed in the first region, the visibility level is set to the first visibility level; and
when the display object is displayed in the second region, the visibility level is set to the second visibility level.

2. The display control device according to claim 1, wherein
the control unit sets a third region within the second region;
when the display object is displayed in the third region, the visibility level is set to the first visibility level or to a visibility level which conforms to the first visibility level and is close to the first visibility level; and
when the display object is displayed in a region other than the third region in the second region, the visibility level is set to the second visibility level.

3. The display control device according to claim 1, wherein the control unit makes a change rate in increasing the visibility level when the display object displayed in the second region moves to the first region slower than a change rate in lowering the visibility level when the display object displayed in the first region moves to the second region.

4. The display control device according to claim 1, wherein the control unit makes a first visibility level increasing mode for a case in which the display object displayed in the second region and related to a traveling lane of the vehicle moves to the first region different from a second visibility level increasing mode for a case in which the display object displayed in the second region and not related to a traveling lane of the vehicle moves to the first region.

5. The display control device according to claim 1, wherein the control unit changes a position of the second region based on first information acquired.

6. The display control device according to claim 5, wherein
the first information includes information pertaining to at least one of a staring angel, a pitching angle, positions of both eyes, and a traveling place, and
the control unit executes at least one of:
detecting a traveling direction of the vehicle from the staring angle and changing the position of the second region in the direction same as the traveling direction;
detecting a shake of the vehicle in the vertical direction from the pitching angle and changing the position of the second region in a direction opposite to the direction of the shake;
changing the position of the second region to a higher position when the positions of both eyes are higher than a reference position, and changing the position of the second region to a lower position when the positions of both eyes are lower than the reference position; and
changing the position of the second region to a position preliminarily set with respect to the traveling direction.

7. The display control device according to claim 1, wherein the control unit changes a size of the second region based on the first information acquired.

8. The display control device according to claim 7, wherein
the first information includes information pertaining to at least one of a staring angel, a pitching angle, positions of both eyes, and a traveling place, and
the control unit executes, based on the first information, at least one of:
changing the second region to have a size larger than a reference size when the staring angle is large;
changing the second region to have a size larger than the reference size when the pitching angle is large;
changing the second region to have a size larger than the reference size when the positions of both eyes are higher or lower than a reference position; and
changing the size of the second region to a size preliminarily set with respect to the traveling place.

9. A display device comprising
an image generation unit generating an image,
a display unit displaying the image,
an optical system including an optical member, wherein the optical member reflects display light from the image and projects same onto a projection member, and
the display control device according to claim 1.

10. A display control method controlling a display form and a visibility level of a display object, wherein
the display form is changed by variably controlling at least one of the number of display elements constituting the display object and a size of the display elements;
in a case where visibility lowering processing for setting the visibility level of the display object to a second visibility level lower than a first visibility level by adjusting at least one of transmittance, chromaticness, brightness, and luminance of the display object is executed, display object recognition performance improving processing is executed, the display object recognition performance improving processing involving at least one of:
increasing the number of display elements constituting the display object compared with a case where the visibility level is set to the first visibility level; and
expanding a size of all or some of the display elements constituting the display object compared with the case where the visibility level is set to the first visibility level;
setting, within a virtual display region in real space in front of an occupant of a vehicle, a first region including a part corresponding to a near actual sight and a second region including a part corresponding to a far actual sight;
when the display object is displayed in the first region, the visibility level is set to the first visibility level; and
when the display object is displayed in the second region, the visibility level is set to the second visibility level.

* * * * *